4 Sheets--Sheet 1.

R. M. HOE & S. D. TUCKER.

Improvement in Printing Presses.

No. 4,400. Reissued May 30, 1871.

Richd. M. Hoe
Stephen D. Tucker
Inventors

Robert H. Manney
Edmund L. Osborn
Witnesses.

4 Sheets--Sheet 2.

R. M. HOE & S. D. TUCKER.

Improvement in Printing Presses.

No. 4,400. Reissued May 30, 1871.

4 Sheets--Sheet 3.

R. M. HOE & S. D. TUCKER.

Improvement in Printing Presses.

No. 4,400. Reissued May 30, 1871.

R. M. HOE & S. D. TUCKER.

Improvement in Printing Presses.

Reissued May 30, 1871.

No. 4,400.

UNITED STATES PATENT OFFICE.

RICHARD M. HOE AND STEPHEN D. TUCKER, OF NEW YORK, N. Y.

IMPROVEMENT IN PRINTING-PRESSES.

Specification forming part of Letters Patent No. 84,627, dated December 1, 1868; reissue No. 4,400, dated May 30, 1871.

Be it known that we, RICHARD M. HOE and STEPHEN D. TUCKER, of the city, county, and State of New York, have invented certain Improvements in Printing Machinery, of which the following is a specification:

*Nature and Objects of the Invention.*

The first part of this invention consists in combining feeding-tables, from which the sheets to be printed are supplied, with mechanism for taking the sheets of paper alternately from the opposite feeding-tables, and presenting them in rapid succession to the impression-cylinder; and the invention has for its object to more rapidly feed the sheets of paper to be printed in printing-machines. The second part of this invention consists in a mechanism by which the sheets, as they come from the printing-machines, are directed alternately to opposite sides so as to be delivered in piles alternately on one and then on the other side, either by two separate fly-frames, or, as the equivalent thereof, a double-acting fly-frame; and this part of said invention has for its object the more rapid delivery of the printed sheets. The third part of said invention consists in a means of securing stereotype or other solid printing-plates or surfaces directly to the surface of the type-cylinders of printing-machines, by means of which the blocks and iron frames heretofore employed for the purpose are dispensed with; and it has for its object to avoid the serious inconveniences produced in the use of them.

*Description of the Accompanying Drawing.*

Figure 1:
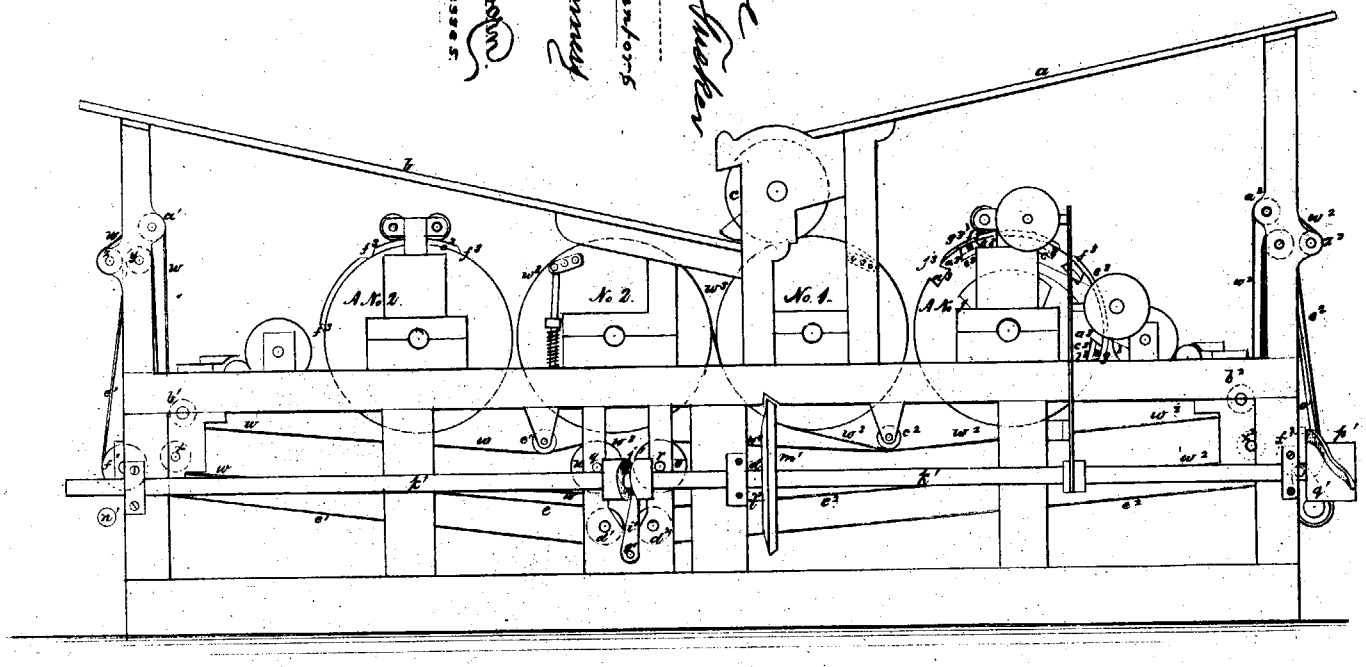
Figure 2:
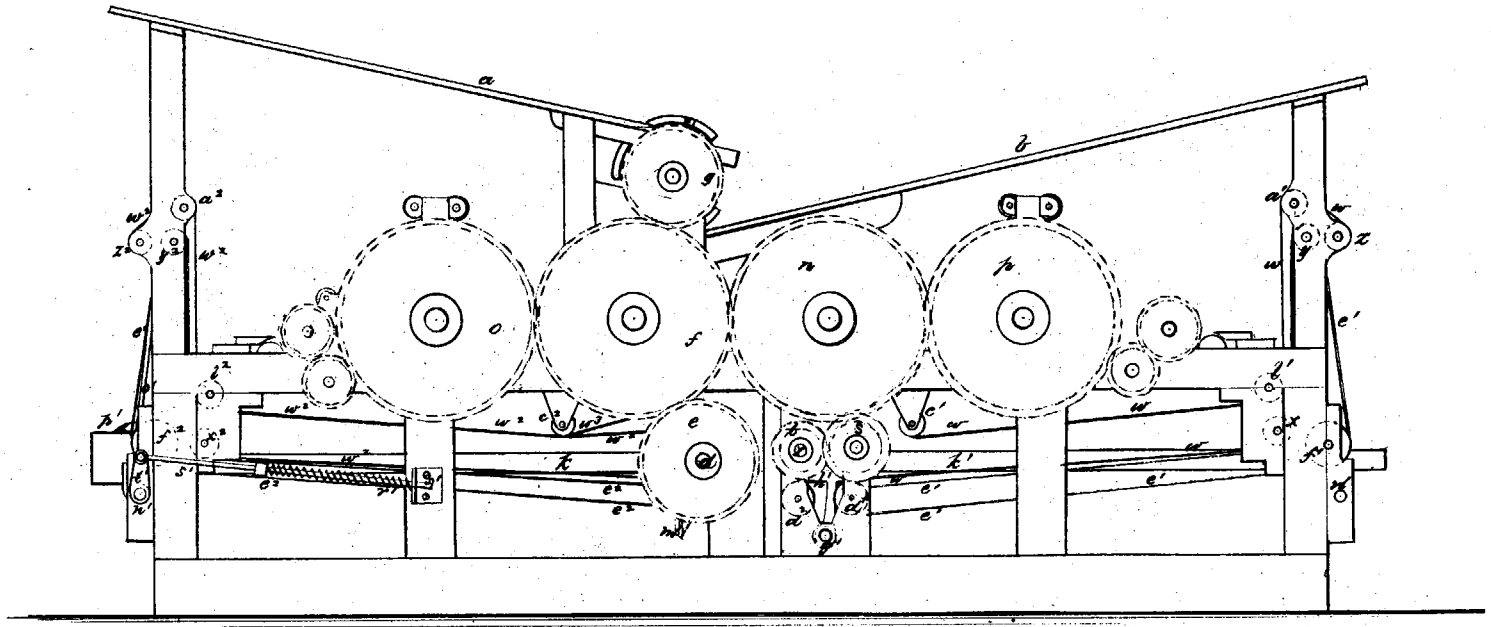
Figure 3:
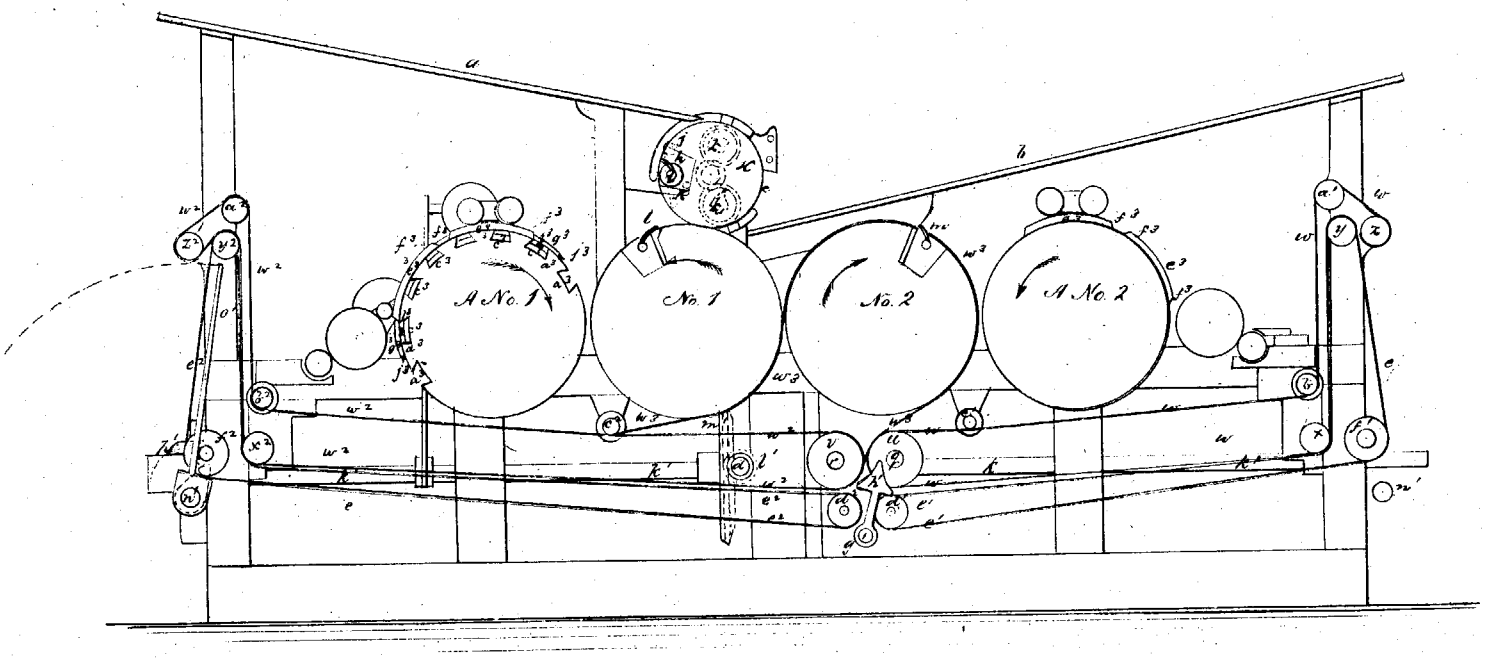
Figure 5:
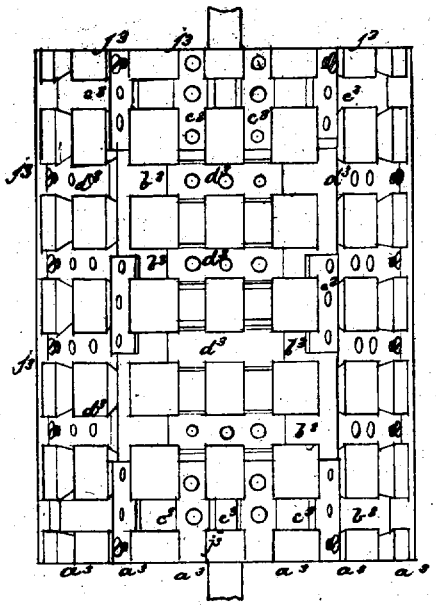
Figure 4:
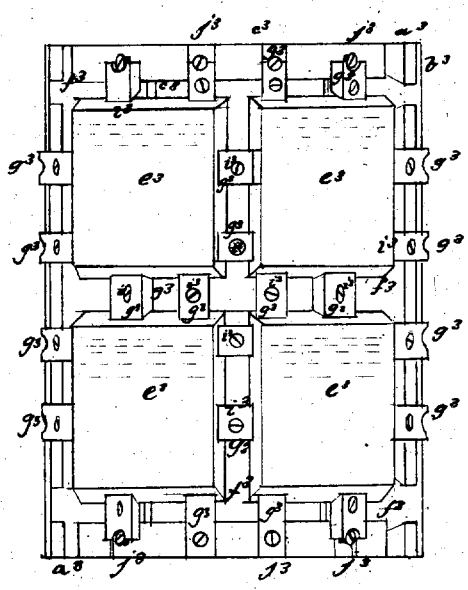

Figure 1 is an elevation of the front of the machine. Fig. 2 is an elevation of the back. Fig. 3 is a vertical section in a plane parallel to the plane of Figs. 1 and 2, and representing, by dotted lines, the mechanism beyond the feeding-in cylinder. Fig. 4, a face view of one of the type-cylinders, with the stereotype-plates secured to it. Fig. 5, a like view, with the stereotype-plates removed.

Similar letters of reference indicate like parts in the several figures in which they occur.

*General Description.*

We will first describe the construction and operation of the first part of said invention.

In Figs. 1, 2, and 3 of the drawing, *a* and *b* represent inclined feeding-tables, on which the sheets of paper are to be placed, and from which they are successively fed by operatives to the feeding-in cylinder. The lower end of the upper feeding-table *a* is just above, and that of the table *b* just below, the feeding-in cylinder *c*. They are to be provided with the usual means to enable the operative to present the lower edge of each sheet to the proper place to be taken by the gripers or fingers. The feeding-in cylinder *c* is of the usual construction, with gripers or fingers to seize and carry forward the sheets, and it receives motion from the main shaft *d* by the train of cog-wheels *e f g*. It is provided in the usual manner with griping-fingers *h* projecting from a shaft, *i*, mounted in a recess made for that purpose, and one end of the said griper-shaft projects beyond one end of the cylinder, and is provided with a wing and crank-pin, *j*, which are actuated by mechanism *k*, mounted in the side frame, to turn it when the griping-fingers are turned in one direction to gripe the edge of a sheet of paper against the surface of the cylinder, and then in the opposite direction to liberate the sheet. This mechanism *k* is of the usual and well-known construction heretofore used; but that part of it for closing the fingers is duplicated, the two sets being represented at K K, one set being above and the other below the shaft of the feeding-in cylinder *c*, one set to operate the fingers for taking the sheets from one, and the other for taking the sheets from the other, feeding-table.

The machine being in operation, a sheet of paper on the feeding-table *a* is moved down by the operative to the proper gage so that its lower edge will be in the required position to be griped by the fingers of the feeding-in cylinder. So soon as griped the sheet is carried around and presented to the impression-cylinder No. 1, which is on the shaft of the cog-wheel *f*, and receives motion from the main shaft by the cog-wheel *e*. This cylinder is provided, as in the usual manner, with griping-fingers *l*, operated in the usual manner, which gripe the same edge of the sheet as it is liberated by the griping-fingers of the feeding-in cylinder. The sheet of paper thus transferred is presented to the type-cylinder A, No. 1, and receives the required impression on one surface, and, while it is being so printed, it continues to be held to the surface of the impression-cylinder No. 1 until the self-same edge is carried up and presented to and griped to the surface of the impression-cylinder No. 2 by its griping-fingers *m*, at the same time that it is liberated by the griping-fingers *l* of the impression-cylinder No. 1. The impression-cylinder No. 2 is constructed in all respects like No. 1, and is provided in like manner with griping-fingers. It is turned with equal velocity, but in the reverse direction, by the cog-wheel *n* on its shaft, which receives motion from the cog-wheel *f* on the shaft of the impression-cylinder No. 1. The end of the sheet of paper which is not griped is held up by tapes against the under side of the impression-cylinder No. 1 as it is passing to the cylinder No. 2. These tapes will hereafter be described. The sheet of paper by being thus transferred from impression-cylinder No. 1 to No. 2 is reversed, so that the surface which has been printed is in contact with the surface of impression-cylinder No. 2 and its imprinted surface outside, and that is in succession presented to and printed by the type cylinder A, No. 2. The type-cylinder A, No. 1, receives motion from the impression-cylinder No. 1 by cog-wheels *f* and *o*, and the type-cylinder A, No. 2, from impression-cylinder No. 2 by the cog-wheels *n* and *p*. The surfaces of all four of these cylinders travel at the same speed and in the direction indicated by the arrows in Fig. 3. After the sheet of paper has been printed on the second surface by the type-cylinder A, No. 2, it is to be carried off and delivered, which operation will be presently described. While the first sheet of paper is being printed on one side and delivered by the impression-cylinder No. 1 to the impression-cylinder No. 2, as above described, a second sheet of paper is presented from the feeding-table *b*, as described, with reference to the first sheet on the feeding-table *a*, so that at the next operation the griping-fingers of the feeding-in cylinder, instead of being operated when opposite the lower end of the feeding-table *a*, are operated when they come opposite the lower edge of the feed-table *b*, from which they take the second sheet, which is in turn presented to and taken by the fingers of the impression-cylinder No. 1 at the beginning of the second revolution of that cylinder, carried around to be printed on one surface by the type-cylinder A, No. 1, presented to the impression-cylinder No. 2, and the reverse side presented by it to the type-cylinder A, No. 2, to be printed, and then delivered, as before.

In the manner above described, the sheets of paper are taken alternately from the feeding-tables by the same feeding-in mechanism, so that the machinery can be carried at the desired velocity to print on both sides as fast as the sheets can be presented by the operative from the feeding-tables.

In the drawing, Figs. 1 and 3, it will be seen that the type-cylinders have forms upon half their surface only, and for more rapid printing it will only be necessary to give the other half of the type-cylinder a form, provide additional feeding-tables, increase the size of the feeding-in cylinder *c*, provide additional fingers for additional sheets to be printed, and thus double the capacity of the press, (the sheets being fed from the tables alternately.)

The type-cylinders are to be provided with the usual or other suitable inking apparatus, not necessary to be described.

The sheets of paper will be delivered from such a printing-machine too rapidly to be laid in one pile by the mechanism usually employed for that purpose, and known as the "fly," as such mechanism has been heretofore applied.

We will now describe the second part of said invention.

Referring to the same drawing, *q* and *r* represent two parallel shafts, which are rotated in opposite directions by pinions *s* and *t*, on their outer ends, the one *s* receiving motion from the cog-wheel *n* on the shafts of the impression-cylinder No. 2. These two shafts carry each a series of pulleys, *u* and *v*. A series of tapes, *w*, passes around the series of pulleys *u* of the shaft *q*. From the under side of *n* they pass under a guide-roller, *x*, at one end of the frame, and thence upward over a second guide-roller, *y*, near the top of the frame; thence under and around a third guide-roller, *z*, to and over a fourth guide-roller, *b*, just above and a little back of the roller *x*, before described; then back to the series of pulleys *u*, passing under a sixth guide-roller, $c^1$, near the pulleys *u*. Just below the series of pulleys *u* there is a corresponding range of pulleys, $d^1$, on a loose shaft, and these pulleys carry another series of tapes, $e^1$, which pass from the top of the pulleys $d^1$ to and under the tapes *w*, where they pass under the guide-roller *x*; thence up over the guide-roller *y* down to and under a series of pulleys, $f^1$, back to the series of pulleys $d^1$.

A sheet of paper being delivered between the two series of tapes *w* and $e^1$, at the bight of the two series of pulleys *u* and $a^1$, will be carried along in nearly a horizontal direction between the two series of tapes to and under the guide-roller *x*; thence nearly in a vertical direction to and over the guide-roller *y*, over to the front of this roller, while the series of tapes *w* leaves it to return, and it will then descend in nearly a vertical direction in front of the series of tapes $e^1$, and in front of the fly-frame, so that at the instant the upper end of the sheet is liberated in front by the series of tapes *w* it can be thrown down upon the pile by the fly-frame. At the other end of the frame there is a like arrangement of pulleys, tapes, and guide-rollers to carry and deliver sheets of paper in the opposite direction. These corresponding duplicate parts are indicated on the drawing by corresponding letters, which are marked 2 to designate them from the parts above described. Some of the series of tapes marked $w^2$ on this end of the machine, instead of being arranged as the others of the series, or like the tapes $w$ at the end of the machine, already described, are made of greater length, and pass from the sixth guide-roller $c^2$ under and around a portion of the impression-cylinder No. 1, to hold up the sheets of paper and prevent them from falling from the impression-cylinder before being effectually transferred. From this they pass over and around the impression-cylinder No. 2, and thence down to the series of pulleys $v$ on shaft $r$, before described. These tapes of the series $w^2$ are marked $w^3$ to distinguish them from the rest of the series. Where they pass around the impression-cylinder No. 1 they are outside of the sheet of paper, which may be passed through the machine, but where they pass around the impression-cylinder No. 2 they are between the sheet of paper and the surface of the cylinder, so that they guide the end of the sheet of paper, after it has been printed, to the space between the two series of pulleys $u$ and $v$ on the shafts $q$ and $r$; and as the sheets of paper are to be delivered alternately in opposite directions when they enter the space between the pulleys $u$ and $v$ to be carried to one end between the two series of tapes $w$ and $e^1$, or to the opposite end between the two series $w^2$ and $e^2$, the ends of the sheets are to be pushed alternately in opposite directions. For this purpose there is a horizontal rock-shaft, $g^1$, just below the shafts $q$ and $r$, and in a plane perpendicularly between them. From this shaft projects upward a series of guide-rods, $h'$, which play in the spaces between the pulleys $u$ and $v$. On the other end of the shaft $g^1$ there is an arm, $i'$, the upper end of which is in a cam-groove, $j$, on a longitudinal shaft, $k'$, which receives motion from the main shaft $d^1$ by a bevel-pinion, $l$, and bevel-wheel $m'$, so proportioned as to give to the longitudinal shaft $k'$ half a revolution to one of the impression-cylinders, the cam-groove being so formed as to vibrate the guide-rods to one side for one revolution of the impression-cylinder, and in the opposite direction for the next revolution. The upper ends of the guide-rods are spear-shaped, so that when thrown in one direction between the pulleys of the series $w$ they will form guides to direct the sheet of paper between the two series of tapes $w^2$ and $e^2$, and, when vibrated in the opposite direction, they will guide the sheet of paper to and between the two series of tapes $w$ and $e^1$. In this way the sheets of paper are taken and alternately delivered in opposite directions. At each end of the frame there is a rock-shaft, $n'$, with a series of parallel rods, $o'$, which constitute the fly-frame. Both of these shafts are represented in the accompanying drawing, but only one of the fly-frames and appendages is represented, as one is but the repetition of the other. When at rest the rods of the fly-frames are in a nearly vertical position, and a little back of the series of tapes $e^2$, where these are nearly in a vertical position, and as soon as the sheet of paper is liberated by the series of tapes $w^2$ it is struck by the rods $o'$ of the fly-frame and thrown down in a pile. The fly-frame is drawn up by a cam, $p'$, on the end of the longitudinal shaft $k'$, which acts on an arm, $y'$, on one end of the rock-shaft, the cam being so formed as to hold up the fly after lifting it, and until a sheet is to be delivered, and then the cam passes the arm $q'$ and permits the fly to be thrown out by a spring, $r'$, on a rod, $s'$, which is connected with a crank-pin of arm $t^1$, on the end of the rock-shaft $n'$. The cams at the two opposite ends of the shaft $k^1$ are to be so placed that they will alternate the operations of the two fly-frames.

We will now describe the third part of our invention.

Referring to the drawing, Figs. 3, 4, and 5, longitudinal and transverse grooves, $a^3$ and and $b^3$, are formed in the periphery of the printing-cylinders. These grooves are dovetailed, and to them are fitted counter-clamp blocks $c^3$ $d^3$, so as to slide therein. The stereotype or other printing-plates $e^3$, curved so that their inner surfaces will fit the periphery of the printing-cylinders, are formed with their outer edges beveled from the outside of the printing-surface, as represented at $f^3$.

The plates so prepared are placed in their required positions on the periphery of the printing-cylinder, and there clamped by outer clamping-blocks $g^3$, by means of screws $i^3$, which pass through the outer clamping-blocks, and which are tapped into the outer clamping-blocks. The outer clamping-blocks at the outer edges of the outer plates are prevented from yielding outward, when clamping the beveled edge of the plates, by screws $j^3$, which are tapped into the counter clamping-blocks, and bear against the cylinder, and their heads are fitted to semicircular recesses in the outer edges of the clamping-blocks.

As the two series of counter clamping-blocks are fitted to slide in the two series of grooves, which are at right angles to each other, and the outer clamping-blocks are fastened to these, it follows that they can be adjusted in position to clamp plates of any size directly to the surface of the cylinder, for when the outer and the counter clamping-blocks are drawn together by the screw, the outer blocks are drawn to the counter-blocks and to the outer beveled faces of the edges of the plates, thereby drawing these plates directly to the surface of the cylinder.

Having thus fully described the novel features and characteristics of said invention, what we claim is—

1. The combination of two or more feeding-tables, with the means described, or the equivalent thereof, for taking the sheets of paper from the feeding-tables and conducting them to the impression-cylinders, substantially in the manner and for the purpose described.

2. Separating or changing the direction of the printed sheets of paper so that they may be automatically piled in two or more piles, or in more than one pile, by mechanism constructed and operating substantially as described.

3. The means, substantially as herein described, for clamping stereotype or other printing-plates directly to the surface of the type-cylinder, as set forth.

RICHD. M. HOE.
STEPHEN D. TUCKER.

Witnesses to signature of R. M. HOE:
O. H. IRISH,
O. ARNOUX.
Witnesses to signature of S. D. TUCKER:
JOHN E. DONIGAN,
FRANK PURDY.